United States Patent [19]
Stowe

[11] Patent Number: 5,199,997
[45] Date of Patent: Apr. 6, 1993

[54] TREATMENT OF HYDROCARBON-CONTAMINATED PARTICULATE MATERIALS

[75] Inventor: Gene B. Stowe, Phoenix, Ariz.

[73] Assignee: clnZall Corporation, Scottsdale, Ariz.

[21] Appl. No.: 714,651

[22] Filed: Jun. 13, 1991

[51] Int. Cl.$^5$ .......................... B08B 3/00; B08B 3/04; B08B 3/10
[52] U.S. Cl. .................... 134/25.1; 134/10; 134/26; 134/40; 134/42
[58] Field of Search .................. 134/25.1, 10, 26, 40, 134/42

[56] References Cited

U.S. PATENT DOCUMENTS

| | | | |
|---|---|---|---|
| 2,919,898 | 1/1960 | Marwil et al. | 255/1.8 |
| 3,544,369 | 12/1970 | Keough, Jr. | 134/25 |
| 3,639,172 | 2/1972 | Keogh, Jr. | 134/25 |
| 3,688,781 | 9/1972 | Talley, Jr. | 134/56 R |
| 3,693,733 | 9/1972 | Teague | 175/66 |
| 3,723,309 | 3/1973 | Garcia | 210/44 |
| 3,759,324 | 9/1973 | Mecusker | 166/75 |
| 3,766,997 | 10/1973 | Heilhuker et al. | 175/66 |
| 3,860,019 | 1/1975 | Teague | 134/109 |
| 3,964,557 | 6/1976 | Junkam-Wold | 175/66 |
| 4,040,866 | 8/1977 | Mondshine | 134/26 |
| 4,090,523 | 5/1978 | Kelly, Jr. et al. | 134/18 |
| 4,146,483 | 3/1979 | Lee | 210/384 |
| 4,152,253 | 5/1979 | Summers | 209/17 |
| 4,192,392 | 3/1980 | Messines et al. | 175/66 |
| 4,234,413 | 11/1980 | Summers | 209/17 |
| 4,242,146 | 12/1980 | Kelly, Jr. | 134/7 |
| 4,243,527 | 1/1981 | Leonard | 210/785 |
| 4,350,591 | 9/1982 | Lee | 210/384 |
| 4,350,596 | 9/1982 | Kennedy, Jr. | 210/708 |
| 4,378,290 | 3/1983 | Kennedy, Jr. | 210/103 |
| 4,451,377 | 5/1984 | Luxemburg | 134/40 |
| 4,459,207 | 7/1984 | Young | 209/269 |
| 4,480,702 | 11/1984 | Kelly, Jr. | 175/66 |
| 4,546,783 | 10/1985 | Lott | 134/109 |
| 4,595,422 | 6/1986 | Hill et al. | 134/19 |
| 4,634,535 | 1/1987 | Lott | 210/780 |
| 4,645,608 | 2/1987 | Rayborn | 252/8.51 |
| 4,670,139 | 6/1987 | Spruill et al. | 210/167 |
| 4,696,353 | 9/1987 | Elmquist et al. | 175/206 |
| 4,911,834 | 3/1990 | Murphy | 210/167 |

OTHER PUBLICATIONS

Encyclopedia of Chemical Technology, 3rd Ed., vol. 17, Wiley & Sons, pp. 143–167, Dec. 1980.
"Drilling Fluids Selection, Performance & Quality Control," John Kelly, Jr., May 1983, pp. 889–898.
Oil & Gas Journal, Aug. 1972, "Cuttings can meet offshore environment specifications", John Kennedy, pp. 73–76.

*Primary Examiner*—Theodore Morris
*Assistant Examiner*—Zeinab El-Arini
*Attorney, Agent, or Firm*—Charles E. Cates; Frank T. Barber

[57] ABSTRACT

This invention relates to methods and apparatus for cleansing oil-contaminated particulate materials. The invention is particularly applicable to the treatment of oil well drill sites and to methods and means for continuously cleansing drill cuttings found in used drilling muds. An initial step involves the use of an inclined tub equipped with an inclined spiral conveyor for continuous stripping of the oil and other contaminants from the drill cuttings, and a second step involves the use of a similar inclined tub and inclined spiral conveyor for continuous hot rinse water treatment of the stripped cuttings. An optional ambient or cold water final rinsing step is also disclosed.

25 Claims, 3 Drawing Sheets

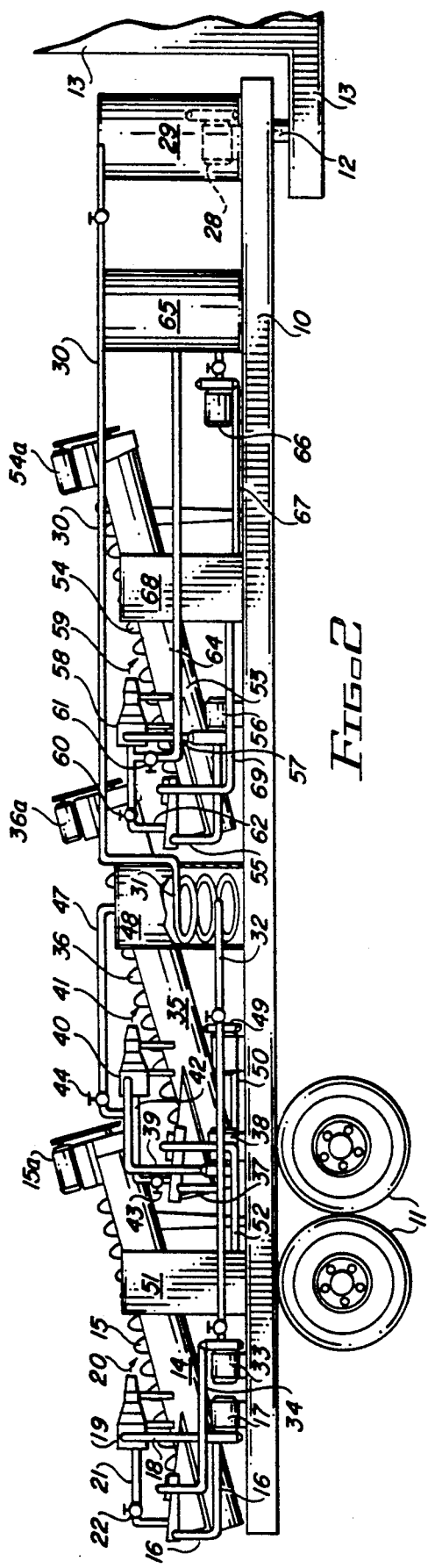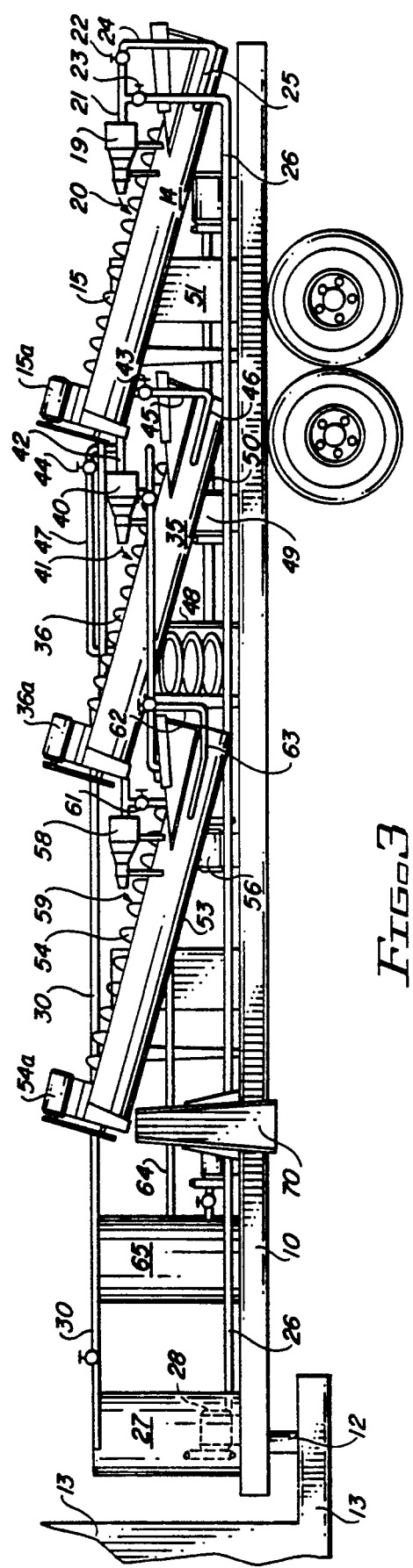

TREATMENT OF HYDROCARBON-CONTAMINATED PARTICULATE MATERIALS

FIELD OF THE INVENTION

This invention relates to methods and apparatus for cleansing oil-contaminated particulate materials. The invention is particularly applicable to the treatment of oil well drill sites and to methods and means for continuously cleansing drill cuttings found in used drilling muds.

BACKGROUND AND PRIOR ART

In the drilling of oil wells, gas wells, and the like, it is conventional practice to use a drilling mud to enhance the efficiency of the operation. The drilling mud is continuously circulated from a storage area on the surface, downward through the drill pipe, and then upward through the borehole to the surface. The purpose of the mud is to remove drilled solids, such as cuttings and formation cavings, from the borehole to the surface. It also serves to cool and lubricate the bit, to form a filter cake on the borehole wall, and to prevent pressure from being lost if a void or high pressure gas pocket is encountered.

Drilling muds usually contain a number of components, including barium, hematite, iron sulfite, and the like. They are kept in containers near the drilling rig, each of the containers holding different grades of drilling mud for use at different levels of the drill. Before use in many applications, the above components may be mixed with oil to produce the final form of mud.

In order for drilling mud to perform its desired functions, it is necessary to maintain its viscosity and density within prescribed limits. This is difficult when it is considered that drill cuttings and formation cavings are constantly and inherently being accumulated in the mud, thereby increasing its viscosity and density. Therefore, in customary operations the practice is to separate solids from the mud which is returned to the surface. A technique commonly employed is to pass the mud first through a vibrating screen, sometimes referred to as a shale shaker, to remove the large cuttings and other particles, and then through a series of hydrocyclones to remove smaller size particles. The mud which passes through both the vibrating screen and the hydrocyclones is returned to the storage bins for reuse, and the solids removed from the mud are discarded at various places surrounding the drill site.

The discarded solids present a significant disposal and environmental problem. After the well is shut down, the site must be cleaned. The contents of the slush ponds containing the discarded materials must be dug up and hauled away to toxic waste dumps. The expense of this, plus the cost and effort involved in obtaining the necessary toxic waste permits, plus the continuing liability from potential damage from the waste, creates a serious problem.

It is an object of the present invention to provide methods for cleansing discarded materials from the drilling mud operations, without any materials being hauled to toxic disposal sites.

It is a further object of the invention to carry out the cleansing operation in such manner that drill cuttings and formation cavings may be cleansed and returned to the soil surrounding the drill site free of contamination.

It is another object to separate desired drilling mud components from the discarded material and make them available for re-use in further drilling mud formulae.

It is still another object to accomplish the cleansing operation with reagents which may be restored and recycled through the cleaning system to substantially reduce the cost of operation.

It is yet another object to provide apparatus and equipment for accomplishing the foregoing.

Other objects and advantages will become apparent as the specification proceeds.

SUMMARY OF THE INVENTION

The method of the present invention comprises, as its initial step, the extraction of oil from oil-coated aggregate or particulate material by continuously feeding the aggregate into an inclined tub filled with a heated stripper solution and fitted with a rotating screw for continuously elevating the aggregate above the surface of the heated stripper solution after it has been agitated and stripped free of oil by the stripping action of the solution. During the extraction procedure, stripping solution is continuously withdrawn from the inclined tub, and allowed time for settling and for the extracted oil to be separated by floating, and finally returned through a heat exchanger to the tub for re-use in the extraction process. During its dwell time in the tub, the aggregate is subjected to agitation caused by the rotation of the screw and the reintroduction of the high temperature, cleaned, pressure and pump activated stripping solution.

As the next step, the de-oiled aggregate which is elevated above the stripping solution is continuously fed into a second inclined tub filled with hot rinse liquid and also fitted with a rotating screw for continuously elevating the aggregate above the surface of the hot rinse liquid body after it has been agitated and cleansed of the stripper solution. During the hot rinsing procedure, rinse liquid is continuously removed from the second inclined tub, allowed time to remove oil and other hydrocarbon materials by settling, and then, after thorough filtering, returned to the second inclined tub to be re-used in the cleansing process. During its dwell time in the second inclined tub, the aggregate is subjected to violent agitation caused by the rotation of the screw and the reintroduction of the filtered, pressure pump activated rinse water.

As an optional third step, the extracted and cleansed aggregate may be introduced into a third inclined tub filled with cold rinse water and also fitted with a rotary screw to elevate the treated aggregate above the surface of the rinse water, as in the preceding step.

After processing in the foregoing manner, the aggregate has been thoroughly cleansed. It no longer constitutes a toxic waste and may be returned to the environment or used for conventional purposes such as building construction, road building and the like.

The invention is particularly applicable to the treatment of oil well drill cuttings which are coated with oil and with other drilling mud components, and which constitute a toxic waste problem in their untreated form. In such case, as a fourth step, the cleansed aggregate issuing from the final inclined tub is screened to separate the coarse particles (usually the drill cuttings and formation cavings) from the finer particles comprising valuable drilling mud components which have adhered to the cuttings. The cleansed coarse particles are ready for use or return to the environment, as indicated above. The fine particles may be further classified and returned to the drilling mud formulations.

The invention also includes the apparatus and means for carrying out the various steps and procedures outlined above.

It is a feature of the invention that the entire assembly of equipment used in the procedure may be mounted on wheels, such as a fifth wheel trailer hitch, so that the unit is portable and may be transported to well sites, spill sites, and other locations where oil-contaminated aggregate must be treated. It is another feature of the invention that the solutions and detergent liquids used in the procedure are continuously withdrawn, purified, and reintroduced into the process as the operation proceeds.

BRIEF DESCRIPTION OF THE DRAWINGS

The objects, features and advantages of the invention will be apparent to those skilled in the art from the following detailed description, taken together with the accompanying drawings, in which:

FIG. 2 is a right side elevation of said rig and equipment.

FIG. 3 is a left side elevation of said rig and equipment.

DETAILED DESCRIPTION OF THE INVENTION

Although the invention is applicable to the treatment of oil-contaminated aggregate or particulate material in general, a particularly useful application involves the treatment of oil well drill cuttings separated from used drilling mud, and the invention will be described in terms of such use.

Figure 1:
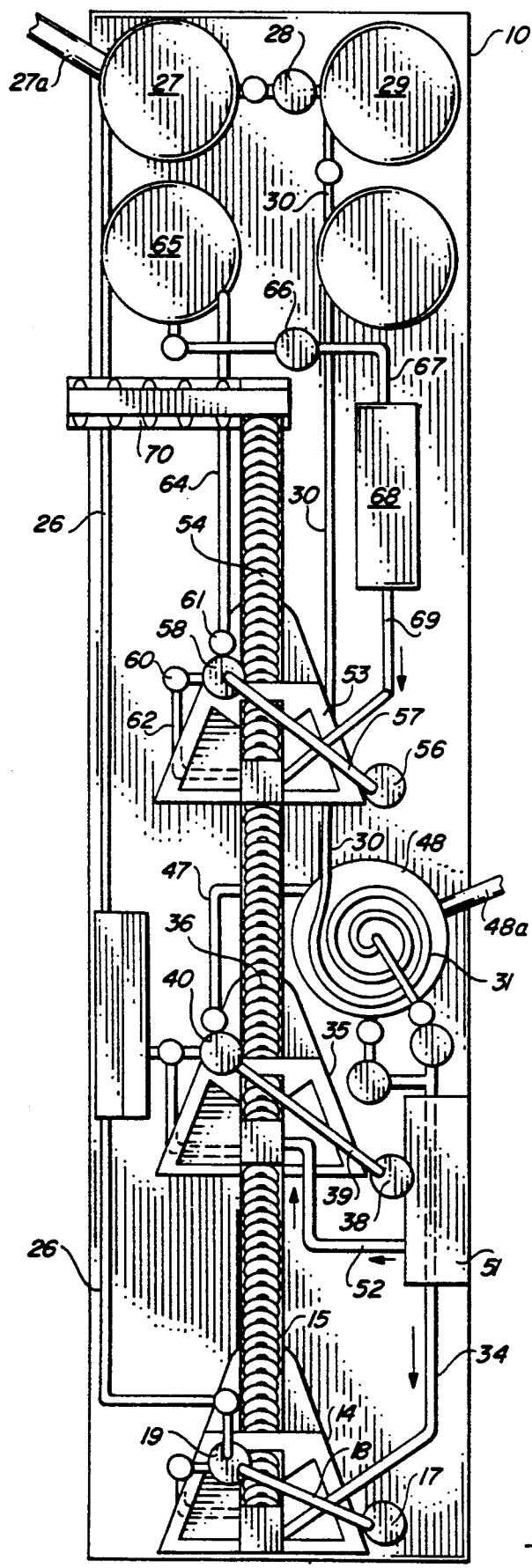
FIG. 1 is a top plan view of a trailer rig carrying the equipment used in the invention.

Referring to FIGS. 1, 2 and 3 of the drawings, the invention contemplates a flat bed 10 on which the equipment is mounted. The bed 10 may be outfitted as a movable trailer, having wheels 11 and a hitch 12 for attachment to the fifth wheel of a truck 13. It will be noted that, in the embodiment shown in FIGS. 1, 2 and 3, the procedure of the invention involves three stages—namely, a stripper classification stage, a hot rinse classification stage, and a cold rinse classification stage. These stages will be described in the following sections:

The Stripper Classification Stage

Referring to FIGS. 1, 2, and 3, there is mounted at one end of the bed 10 a first inclined tub or container 14, fitted with a rotating continuous screw 15, driven by a motor 15a. Conveyor means (not shown) are provided for continuously introducing oil-contaminated drill cuttings into the tub from above. When the tub 14 is filled with stripping solution suitable to the contaminants, the lower end of the screw is submerged in the solution and is designed to convey aggregate in the tub upwardly along the screw until the aggregate is elevated above the surface of the stripper solution body and finally discharged into the next stage of the procedure. If desired, some of the lower screw flights may be replaced with paddle flights, which are useful in creating more abrasion and turbulence and in retaining the aggregate longer in the scrubbing area.

It is desirable that the flow of stripper solution into the tub 14 is sufficient that a continuous screened overflow occurs at the upper portion of the tub, where this overflow enters a recycling pump, as hereinafter to be described.

As the oil-contaminated aggregate is agitated by the action of the screw and paddle flights and by the introduction of stripper solution in the lower portion of the tub 14 (to be described) a current of stripper is forced up through the aggregate, to dissolve the oil and to carry materials of lighter specific gravity to the surface. At the surface, screened overflow stripper is removed through a weir overflow, removal line 16 and pumped by pump 17 through line 18 to a hydrocyclone 19, which acts to remove solids on the under flow side. The solids 20 are added back to the coarser aggregate being elevated out of the inclined tub 14 by the action of the rotating screw 15.

The hydrocyclone overflow, comprising the stripper solution containing dissolved oil, is removed through line 21 and, as best shown in FIG. 3, is directed in two different directions by the action of valves 22 and 23. These valves are regulated so that approximately 80% of the overflow passes through valve 22, through line 24 and through perforated pipe 25 which is equipped with nozzles to inject the stripper back into the bottom of tub 14 to create a turbulence and to cause a rising current of stripper solution within the tub.

The remaining 20% of the overflow passes through valve 23 and is carried through line 26 to reserve solution tank 27, which serves two purposes: (1) It provides a large quantity of stripper solution to meet increased demand for solution after settling when large quantities of aggregate are introduced into the tub 14; and (2) it allows time for oil contained in the stripper to separate before the solution is further filtered and reheated and returned to the system. A stripper solution inlet pipe 27a is provided for originally introducing stripper solution into the system and for supplying make-up solution as the procedure continues. As further quantities of stripper solution are demanded to replenish the solution withdrawn from the tub 14, the solution is withdrawn from tank 27 and pumped by pump 28 to steam generating unit 29.

In the steam generating tank 29, the stripper solution is heated to use again in the cleaning process or for other purposes. The heated solution is withdrawn from the steam generator tank via line 30, and passes through condensing coils 31 to convert it back to purified liquid stripper solution. The liquid is then pumped from the condensing unit through line 32 and finally, by the action of pump 33, is introduced via line 34 back into the top of tub 14 to replenish the supply of stripper solution therein. It is preferred that the solution have a temperature in the range of 150° F. to 170° F.

Any suitable degreaser/cleaner is effective for use in the procedure of this invention. A preferred degreaser is sold by Etus, Inc., Sanford, Florida, under the name RB DEGREASER. The degreaser preferably is non-toxic and biodegradable and contains no petroleum additives, no solvents, no halogens, no butyl and is not flammable. The degreaser is preferably of the type which creates an emulsion with the oil contained in the aggregate while the solution is under agitation, but separates from the oil quickly upon cessation of agitation. Thus, when the portion withdrawn from the system by hydrocyclone 19 is introduced into the settling tank 27, the stripped oil is separated by flotation from the stripper solution within an hour and may be skimmed off, as previously described. To assist in providing a continuous process, it is desirable in some instances to provide alternate tanks 27.

Normally, the degreaser is supplied as a non-aqueous concentrate. However, it is water-activated and therefore must be mixed with water prior to introduction into the system. It is preferred to use a water:concentrate ratio of approximately 5:1, although ratios as high as 10:1 may be operable under certain conditions. In the process, the concentrate is mixed with cold water in the above ratios and then added to the system through inlet conduit 27a.

The pH of the stripper solution should be maintained within the range of 8.5 to 11, with a pH of approximately 10 being optimal in terms of efficiency and economy. When one part of concentrate is mixed with 5 parts of water, the pH is normally about 10. However, as the solution is heated and used in the system, there is a tendency for the pH to decrease, and this must be monitored. It is preferred that the pH monitoring be carried out at the tank 27, and if the stripper solution which is being returned to tank 27 from the hydrocyclone 19 is below the desired pH 10, this can be adjusted by adding fresh stripper solution into tank 27 through inlet pipe 27a.

The Hot Rinse Classification Stage

The aggregate and other solids which are conveyed upwardly to the discharge end of screw conveyor 15 are drained as they move, but they still retain a quantity of adhered stripper solution. At the discharge end, they fall into a second inclined tub 35 fitted with a rotating continuous screw 36, driven by a motor 36a. The tub 35 is designed to be filled with hot rinse liquid. The lower end of the screw 36 is submerged in the hot rinse water and is designed to convey aggregate in the tub upwardly along the screw until it is elevated above the surface of the rinse water and finally discharged into the next stage of the procedure. If desired, some of the lower screw flights may be replaced with paddle flights, which are useful in creating more turbulence and in retaining the aggregate longer in the scrubbing area. It is desirable that the flow of rinse water into the tub 35 be sufficient to cause a continuous overflow at the screened upper weir portion of the tub, where it may be captured and pumped for recycling, as hereinafter to be described.

As the stripper-containing aggregate is agitated by the action of the screw and paddle flights and by the introduction of rinse liquid in the lower portion of the tub 35, a current of hot rinse water is forced up through the aggregate, to remove stripper solution from the aggregate and to dissolve water soluble reagents contained in the drilling mud mixture, and to carry materials of lighter specific gravity to the surface. At the surface, overflow rinse liquid is removed through screened overflow removal line 37 and pumped by pump 38 through line 39 to a hydrocyclone 40, which acts to remove solids on the under flow side. The solids 41 are added back to the coarser aggregate being elevated out of the inclined tub 35 by the action of the rotating screw 36.

The hydrocyclone overflow, comprising the rinse liquid with retained stripper solution and other materials, is removed through line 42 and, as best shown in FIG. 3, is directed in two different directions by the action of valves 43 and 44. These valves are regulated so that approximately 80% of the overflow passes through valve 43, through line 45 and through perforated pipe 46 which is equipped with nozzles to inject the rinse liquid back into the bottom of tub 35 to create a turbulence and to cause a rising current of hot rinse liquid within the tub.

The remaining 20% of the overflow passes through valve 44 and is carried through line 47 to hot rinse settling tank 48, which serves three purposes: (1) It provides a large quantity of hot rinse liquid to meet increased demand for rinse water when large quantities of aggregate are being processed; (2) it allows time for the oil and rinse water in the liquid introduced through line 47 to separate before the rinse water is further used; and (3) it provides the cooling medium for the stripper solution condensing coil 31 which is located on its interior. As further quantities of hot rinse water are demanded to replenish the water withdrawn from the tub 35, hot water is withdrawn from the tank 48 and pumped by pump 49 through line 50 to rinse water carbon filter unit 51 and then through line 52 back to the top of tub 35 where the filtered liquid is reintroduced into the tub.

As noted, the rinse liquid in the settling tank 48 serves as a cooling medium for the stripper solution condensing coil therein, and the resulting heating of the rinse water serves to increase the efficiency of the water action when it is reintroduced into the tub 35. In the settling tank, dispersed hydrocarbons including solvents can be removed by floating to the top of the body of rinse liquid, or by the use of special filtrate materials, such as the coated particulate material disclosed in copending patent application Ser. No. 07/583,294, filed Sep. 17, 1990. As hot rinse liquid is continuously used in the process, it will load up with soluble chemicals from the drilling mud residues. These may be removed chemically by precipitation on an off-shift basis, and the resulting restored water, together with quantities of fresh make-up water, can be added to the system as needed. A water inlet pipe 48a is provided for adding original water or make-up water to the system. Since each ton of solids being washed normally carries away about 30 to 50 gallons of water, it is necessary to monitor the level of wash water and use the make-up procedure as operation of the system proceeds.

The pH of rinse water should be maintained within the range of 7.0 to 8.5, with a pH of approximately 8 being optimal in terms of efficiency and economy. During operation of the system, there is a tendency for the pH of the wash water to increase out side the above range, and this must be monitored. It is preferred that the pH monitoring be carried out at the tank 48, and if the wash water being returned to tank 48 from the hydrocyclone 40 is above the desired pH 8, this can be adjusted by adding fresh water into tank 48 through inlet pipe 48a. If further adjustment is required, quantities of used wash water can be bled off and, if desired, may be added to stripper solution in tank 27 to assist in raising the stripper solution pH.

The Cold Rinse Classification Stage

The aggregate and other solids which are conveyed upwardly to the discharge end of screw conveyor 35 are drained as they move, but they still retain a quantity of stripper solution. At the discharge end, they fall into a third inclined tub 53 fitted with a rotating continuous screw 54, driven by a motor 54a. The tub 53 is designed to be filled with rinse water. The lower end of the screw 54 is submerged in the rinse water and is designed to convey aggregate in the tub upwardly along the screw until it is elevated above the surface of the rinse water body and finally discharged. If desired, some of the lower screw flights may be replaced with paddle flights, which are useful in creating more turbulence and in retaining the aggregate longer in the scrubbing area.

As the stripper-containing aggregate is agitated by the action of the screw and paddle flights and by the introduction of rinse water in the lower portion of the tub 53, a current of rinse water rises up through the aggregate, to remove stripper from the aggregate and dissolve water soluble reagents contained in the drilling mud mixture, and to carry materials of lighter specific gravity to the surface. At the surface, overflow rinse water is screened and removed through overflow weir removal line 55 and pumped by pump 56 through line 57 to a hydrocyclone 58, which acts to remove solids on the under flow side. The solids 59 are added back to the coarser aggregate being elevated out of the inclined tub 53 by the action of the rotating screw 54.

The hydrocyclone overflow, comprising the rinse water with retained stripper solution, if any, and other materials, is removed through line 42 and, as best shown in FIGS. 2 and 3, is directed in two different directions by the action of valves 60 and 61. These valves are regulated so that approximately 80% of the overflow passes through valve 60, through line 62 and through perforated pipe 63 which is equipped with nozzles to inject the rinse water back into the bottom of tub 53 to create a turbulence and to cause a rising current of rinse water within the tub.

The remaining 20% of the overflow passes through valve 61 and is carried through line 64 to rinse water settling tank 65, where the oil and rinse water separate and are allowed to settle before the rinse water is further used. As further quantities of rinse water are demanded to replenish the water withdrawn from the tub 53, rinse water is withdrawn from the upper part of tank 65 and pumped by pump 66 through line 67 to rinse water filter unit 68 and then through line 69 back to the top of tub 53 where the filtered rinse water is introduced into the tub.

The completely cleaned aggregate and other solids which are conveyed to the discharge end of screw conveyor 54 are drained as they move, and at the discharge end they fall onto an exit conveyor 70. The cleaned solid material exiting from the system comprises the coarser particles, such as the drill cuttings and formation cavings, together with the finer particles constituting the component additives of the drilling mud, such as barite, lignite, hematite, pyrite, bentonite, lime, silica and the like. In practice, it is preferred to pass this exiting mixture across a fine screen which effects separation of the coarser particles from the finer drilling mud components.

At this point, the coarse aggregate is thoroughly cleansed. It no longer constitutes a toxic waste and may be returned to the environment or used for conventional purposes such as building construction, road building and the like. The well operator is saved the expense and effort of landfill disposal, hauling, obtaining of toxic waste dump permits, and the continuing potential for liability from damage which might otherwise be caused by the disposed material.

The fine particles which are separated in the screening may be further classified and returned to the drilling mud formulations. Thus, for example, the fine screened particles may be fluidized and passed through a series of hydrocyclones to classify the various drilling mud components, which may be returned to the well operator for re-use in drilling mud formations, either at the site being cleaned or at other sites if desired.

It is a feature of the invention that, upon shutdown of the well, the total site can be cleaned of all contamination without any materials being sent to a toxic waste disposal dump. All sludge ponds, oil-contaminated soil, and other sources of spent drilling mud can be dug up and processed according to the method of the invention, and all cleaned materials issuing from the process may be either returned to the environment or utilized in further drilling operations.

Although the invention has been described in connection with the treatment of oil-contaminated aggregate contained in used drilling mud, it will be understood that the invention is also applicable to other kinds of oil-contaminated particles. For example, in copending patent application Ser. No. 07/583,294, filed Sep. 17, 1990, a method and composition for cleaning oil spills is described which involves absorbing the oil on a specially coated particulate material. Such particulate material, with the oil absorbed thereon, is particularly suited for treatment by the present invention to remove the oil and to render the particulate material ready for re-use.

Figure 4:
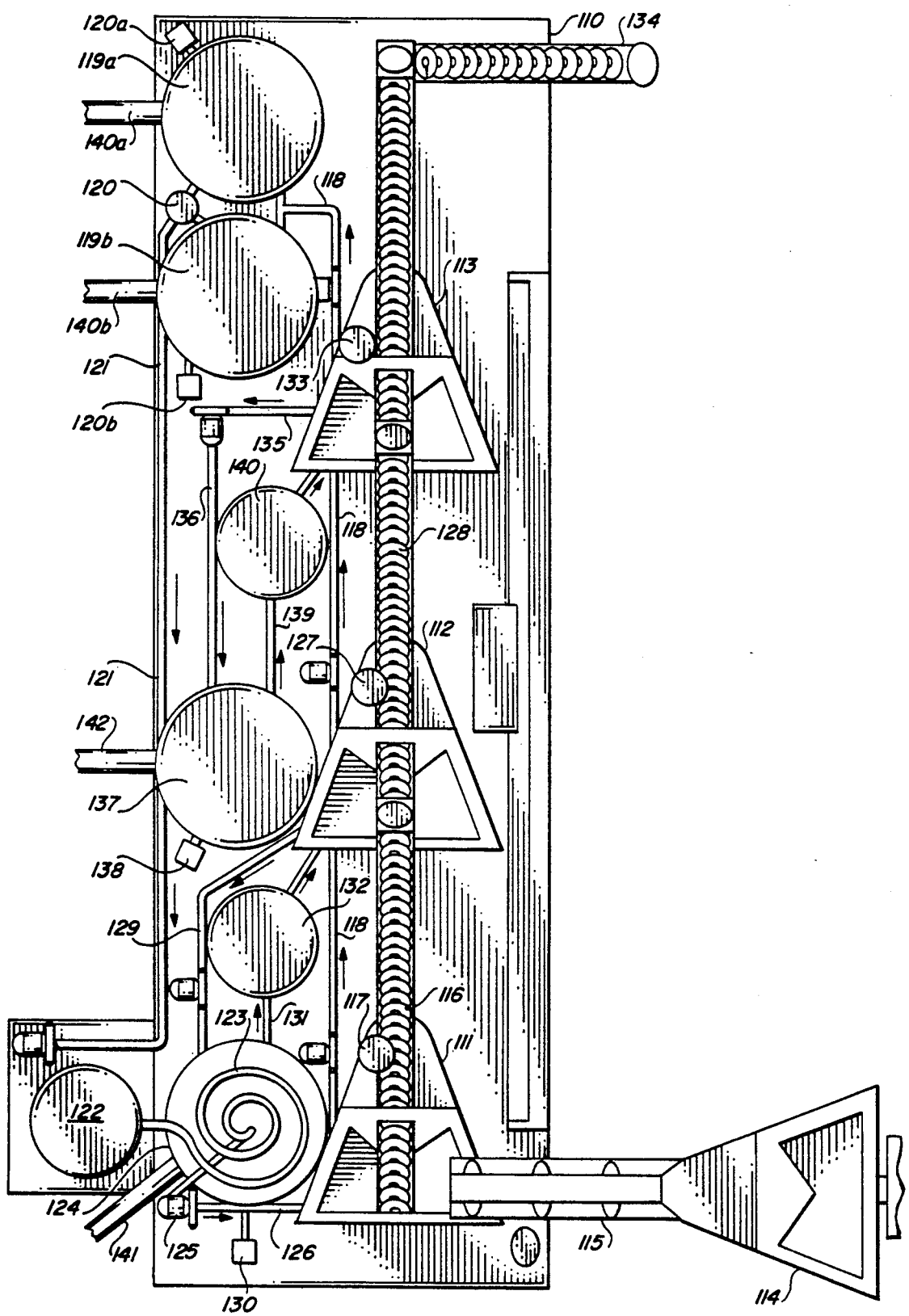
FIG. 4 is a top plan view of a simplified arrangement of equipment for carrying out an additional embodiment of the invention.

FIG. 4 of the drawings illustrates a special embodiment of the invention which introduces efficiencies of economy and simplicity for use in certain applications. In this embodiment, a platform 110, such as a trailer, is provided with a series of three spiral classifiers 111, 112, and 113. Oil laden drill cuttings are introduced into a hopper 114 and conducted from there via a conveyor 115 to the spiral classifier 111. In the wash tank of the classifier, the contaminated cuttings are washed under very high pressure and volume by hot washing (approximately 160° F.) with a non-toxic, no petroleum, no halogen, no butyl, non-flammable, biodegradable degreaser/cleaner which quickly lifts and cleans hydrocarbon contaminations of any type from the solids.

A counterflow of washed solids is achieved by use of the screw conveyor 116 to transport the materials away from the degreaser/cleaner fluid to a subsequent rinse unit. The spiral separation method substantially reduces the quantity of moisture in the washed solids. The high pressure washing of the solids in the spiral classifier tub 111 is provided in part by a pump (not shown) which removes a portion of the degreaser or stripper solution in the tub and circulates it back into the tub through six orifices, three on each side of the tub. The other portion of the fluid in the tub 111 is directed to a hydrocyclone 117, from which the underflow removes slimes or other particles too small to be effectively removed by the spiral classifier. The overflow of this solution from the hydrocyclone 117 reports through line 118 to either of two rehabilitation tanks 119a and 119b where, when agitation is stopped, the oil separates from the oil/stripper emulsion and is skimmed off to drum storage through skimmer valves 120a and 120b. The degreaser/cleaner solution in tanks 119a and 119b is monitored for pH and solution level, and inlet pipes 140a and 140b are provided for introducing fresh solution to adjust the level as well as the pH.

When separated from the oil, the remaining degreaser/cleaner solution in tanks 119a and 119b is passed through filter 120 and then pumped through line 121 to steam generating unit 122. The vapors of stripping solution from this unit pass through condensing coils 123 in tank 124, and the condensed stripping solution is pumped by pump 125 through line 126 back into the tub of the first classification unit 111.

Clean solids, dewatered, removed from the wash bath in unit 111, advance up the incline of screw conveyor 116 to drop into a first rinse unit 112. Again, washing is accomplished by providing hot (approximately 140° F.) high pressure rinse water through six orifices, three to each side of the tub portion of the spiral classifier 112. Pressure is provided by a high pressure pump (not shown) fed by fluid withdrawn from the unit 112 through a fine mesh screen. Approximately 80% of the solution in unit 112 is withdrawn and reintroduced in this manner. The other 20% is directed through hydrocyclone 127, where the centrifuging action causes fine slime particles of solids to separate from the fluid and to be discharged as a slurry from the hydrocyclone underflow back to the spiral classifier. This discharge is above the water line, where the slurry joins other solids as the screw conveyor 128 of the spiral classifier advances all solids to the subsequent rinse unit.

The cyclone overflow, or fluid portion, of the solution remaining after the centrifuging action in hydrocyclone 127 is directed through conduit 129 to the rehabilitation holding tank 124 where, when agitation is reduced, oil separates from the rinse emulsion, rising to the surface of the fluid. When separated from the rinse water, the hydrocarbons are skimmed off for drum storage through skimmer valve 130. During its residency in holding tank 124, it is heated by heat exchange with the condensing coils 123 located in the tank. It is also monitored for water level and pH, and make-up water for adjusting the level and pH is introduced through inlet pipe 141.

The separated and heated rinse water is withdrawn from tank 124 through conduit 131 and then passes first through a filter bag and then through activated charcoal located in filter unit 132, and finally back to the first rinse unit 112 for re-use in the system. When the degreaser/cleaner solution in stripper unit 111 is in need of make up water, this rinse water is advanced to the stripper cycle. It is a feature of the invention that the complete system is self-cleaning except for the carbon filters, which can be cleaned, re-activated and re-used by several methods used in the industry.

Solids advance from the first rinse unit 112 to the final unit 113 by upward movement away from rinse water as the spiral conveyor 128 turns. This action substantially removes all moisture from the solids and drops these solids into the second or final rinse unit 113. This unit uses cold water to completely remove all hydrocarbons.

Washing in unit 113 is again accomplished by providing high pressure and high volume water by pumping through six orifices, three to each side of the unit 113 tub. As with the previous classifier stations, approximately 80% of the rinse water in unit 113 is withdrawn through a screen and pumped to the said washing orifices. The other 20% is directed through hydrocyclone 133, where the centrifuging action causes fine slime particles from the cyclone underflow to separate from the fluid and to be discharged as a slurry back to the spiral classifier 128. This discharge is above the waterline, where the slurry joins other solids as the classifier advances all cleaned, twice-rinsed solids to the discharge conveyor 134.

The overflow from hydrocyclone 133 is directed through conduits 135 and 136 to a second rehabilitation holding tank 137 where, when agitation is reduced, oil, if any, separates from the rinse water. The oil rises to the surface of the rinse water and is skimmed off through skimmer valve 138 to drums for storage. While in holding tank 137, the rinse water is monitored, and its level and pH may be adjusted by adding fresh make-up water through inlet pipe 142.

The rinse water which is separated in holding tank 137 passes through conduit 139 through a filter bag and then through a bed of activated carbon located in filter unit 140. Finally, the clean rinse water is pumped back into the second classifier tub 113 for re-use in the system.

It is a feature of the invention that, instead of the activated carbon used for the filtering in the above-described procedure, it is advantageous to use the special carbonized particulate material described and claimed in copending application Ser. No. 07/583,294, filed Sep. 17, 1990. This is a particulate material having an oleophilic, hydrophobic coating comprising a base layer of a mixture of sulfur, a metallic sulfate, and an alkali metal nitrate, and an outer carbonized layer. The particulate material may be a mineral aggregate such as vermiculite, perlite, pumicite, sand, gravel, silica, and the like. The preferred metallic sulfate is ferrous sulfate; the preferred alkali metal nitrate is sodium nitrate; and the preferred outer carbonized layer is burned hydrocarbon oil.

The method and apparatus of the present invention provide numerous advantages in efficiency, safety and economy in the cleanup of oil well drilling sites:

1. After well shutdown, it is no longer necessary to dig up the contents of the slush ponds and trenches and transport to toxic waste dumps, or to import gravel or other material to the site to cover up or beautify the site. All treated materials are immediately returned to the site where the contamination took place. There is no need for toxic waste permits, nor is there exposure to continuing liability from potential damage from the waste.
2. The reagents used in the system are safe and non-polluting and may be restored and recycled through the cleaning system to substantially reduce the cost of operation. No protective clothing is required.
3. The constant decantation and continuous flow features of the invention produce self-cleaning results at a maximum of efficiency.
4. The system is easily transportable and is designed and equipped for emergency treatment which provides total remediation, as opposed to temporary cosmetic treatment.

Although various preferred embodiments of the invention have been described herein in detail, it will be understood by those skilled in the art that variations may made thereto without departing from the spirit of the invention.

What is claimed is:

1. A method for cleansing particulate material coated with oil comprising the steps of:
    a. continuously introducing said particulate material into a first tank containing a body of hot stripper solution for said oil
    b. agitating said particulate material in said body of solution to dissolve said oil in said stripper solution and remove it from said particulate material;
    c. introducing stripper solution by injection into the bottom of said first tank to assist in the said agitating of said particulate material by creating a turbulence and causing a rising current of stripper solution within said tank;

d. removing overflow stripper solution containing dissolved oil from said tank, treating said solution to remove dissolved oil, heating said stripper solution and reintroducing it into said first tank to replace withdrawn solution for cleansing said particulate material;

e. continuously removing portions of said cleansed particulate material by elevating them above the surface of said body of solution on an inclined conveyor;

f. continuously introducing said removed portions of cleansed particulate material into a second tank containing a body of hot rinse water;

g. agitating said particulate material in said body of hot rinse water to remove residual oil and solution from said particulate material;

h. removing overflow rinse water containing residual oil and stripper solution from said second tank and treating said water to separate oil and stripper solution therefrom;

i. passing said treated rinse water through a filter, and thereafter reintroducing said rinse water into said second tank to assist further in removing residual oil and solution from said particulate material; and j. continuously removing portions of said particulate material, free of oil and solution, from said second tank by elevating them above the surface of said body of rinse water on an inclined conveyor.

2. The method of claim 1 wherein said oil-coated particulate material comprises oil well drill cuttings contained in used drilling mud.

3. The method of claim 1 wherein said oil-coated particulate material comprises oil spill absorbent material.

4. The method defined in claim 1 and further comprising the steps of:

a. continuously introducing said portions of cleansed particulate material, removed from said second tank, into a third tank containing a body of rinse liquid;

b. agitating said particulate material in said body of rinse liquid to remove residual oil and stripping solution from said particulate material;

c. removing overflow rinse liquid containing residual oil and solution from said third tank, treating said rinse liquid to separate oil and solution therefrom, and reintroducing said rinse liquid into said third tank to assist further in agitating and removing oil and solution from said particulate material; and d. continuously removing portions of said particulate material, free of oil and solution, from said third tank by elevating them above the surface of said body of rinse water on an inclined conveyor.

5. A method for cleansing oil well drill cuttings coated with oil and other drilling mud components, comprising the steps of:

a. continuously introducing said cuttings into a first tank containing a body of hot stripping solution for said oil;

b. agitating said cuttings in said body of hot stripping solution to dissolve said oil in said solution and remove it from said cuttings;

c. continuously removing portions of said cleansed cuttings by elevating them above the surface of said body of stripping solution on an inclined spiral conveyor;

d. removing overflow stripping solution containing dissolved oil and suspended drilling mud components from said tank, pumping said oil and stripper solution through a first hydrocyclone, returning solids from the underflow side of said hydrocyclone to said cuttings being removed on said inclined conveyor;

e. reintroducing a first portion of the stripping solution overflow from said first hydrocyclone into said first tank by injection into the bottom of said tank to create a turbulence and to cause a rising current of stripper solution within said tank, to assist in agitating and cleaning said cuttings;

f. removing to a settling tank a second portion of said stripper solution overflow from said first hydrocyclone to remove dissolved oil, skimming said oil from the top of said stripper solution, continuously filtering said solution, heating the same in a steam generator, condensing stripper solution vapors from said generator in a condensing unit, and reintroducing the condensed stripper solution into said first tank to replace withdrawn hot stripper solution for cleansing said cuttings;

g. continuously introducing said removed portions of cleansed cuttings and other drilling mud components into a second tank containing a body of hot rinse water;

h. agitating said cuttings and other drilling mud components in said body of hot rinse water to remove residual oil and stripper solution therefrom;

i. removing overflow hot rinse water containing dissolved oil and suspended drilling mud components from said tank, and pumping said rinse water through a second hydrocyclone;

j. processing solids from the underflow side of said second hydrocyclone for re-use as drilling mud components;

k. reintroducing a first portion of the hot rinse water overflow from said second hydrocyclone into said second tank by injection into the bottom of said tank to create a turbulence and to cause a rising current of stripper solution within said tank, to assist in agitating and cleansing said cuttings and drilling mud components;

l. pumping a second portion of the hot rinse water overflow from said second hydrocyclone into a settling tank for flotation separation of hydrocarbon from said hot rinse liquid;

m. passing said treated rinse water through said condensing unit as a heat exchange agent therefor, to provide cooling for the condensation and to heat the rinse water, and thereafter reintroducing said heated rinse water into said second tank to assist further in removing oil and stripper solution from said cuttings and drilling mud components;

n. continuously removing portions of said cuttings and drilling mud components, free of oil and stripper solution, from said second tank by elevating them above the surface of said body of hot rinse water on an inclined conveyor;

o. screening to separate the said cuttings from said drilling mud components; and p. processing said separated drilling mud components for re-use in drilling mud, and returning the cleaned cuttings to the environment.

6. The method defined in claim 5 and further comprising the added step of introducing said cuttings and drilling mud components removed from said second tank into a third tank for rinsing before separation of the said drilling mud components for re-use.

7. The method defined in claim 5 wherein the said first portion of said overflow from said first hydrocyclone constitutes approximately 80% and said second portion of said overflow from said first hydrocyclone constitutes approximately 20% of the total overflow.

8. The method defined in claim 5 wherein the said first portion of said overflow from said second hydrocyclone constitutes approximately 80% and said second portion of said overflow from said second hydrocyclone constitutes approximately 20% of the total overflow.

9. The method defined in claim 5 wherein the second portion of hot rinse water from said second hydrocyclone is filtered before being reintroduced into said second tank.

10. The method defined in claim 9 wherein said rinse water is filtered with activated carbon.

11. The method defined in claim 9 wherein said rinse water is filtered with a particulate material having an oleophilic, hydrophobic coating comprising a base layer of a mixture of sulfur, a metallic sulfate, and an alkali metal nitrate, and an outer carbonized layer.

12. The method defined in claim 11 wherein said particulate material is a mineral aggregate selected from the group consisting of vermiculite, perlite, pumicite, sand, gravel and silica.

13. The method defined in claim 11 wherein the metallic sulfate is ferrous sulfate.

14. The method defined in claim 11 wherein the alkali metal nitrate is sodium nitrate.

15. The method defined in claim 11 wherein the outer carbonized layer is burned hydrocarbon oil.

16. The method defined in claim 5 wherein said oil well drill cuttings are aggregates separated from used drilling mud by a vibrating 200 mesh screen.

17. A method for cleansing oil well drill cuttings coated with oil and other drilling mud components, comprising the steps of:

a. continuously introducing said cuttings into a first tank containing a body of hot stripping solution for said oil;
   b. agitating said cuttings in said body of hot stripping solution to dissolve said oil in said solution and remove it from said cuttings;
   c. continuously removing portions of said cleansed cuttings by elevating them above the surface of said body of stripping solution on an inclined spiral conveyor;
   d. removing a first portion of stripping solution overflow from said first tank and reintroducing it under pressure into the bottom of said first tank to assist in agitating and cleansing said cuttings;
   e. removing a second portion of overflow stripping solution containing dissolved oil and suspended drilling mud components from said first tank, pumping said oil and stripper solution through a first hydrocyclone, and returning solids from the underflow side of said hydrocyclone to said cuttings being removed on said inclined conveyor;
   f. removing stripper solution overflow from said first hydrocyclone to a settling tank to remove dissolved oil, skimming said oil from the top of said stripper solution, continuously filtering said solution, heating the same in a steam generator, condensing vapors from said generator in a condensing unit, and reintroducing the heated stripper solution into said first tank to replace withdrawn hot stripper solution for cleansing said cuttings;
   g. continuously introducing said removed portions of cleansed cuttings and other drilling mud components into a second tank containing a body of hot rinse water;
   h. agitating said cuttings and other drilling mud components in said body of hot rinse water to remove residual oil and stripper solution therefrom;
   i. continuously removing portions of said cuttings and other drilling mud components by elevating them above the surface of said body of hot rinse water on a second inclined spiral conveyor;
   j. removing a first portion of overflow hot rinse water from said second tank and reintroducing it under pressure into the bottom of said second tank to assist in agitating and cleansing said cuttings;
   k. removing a second portion of overflow hot rinse water containing dissolved oil and suspended drilling mud components from said tank second tank and pumping same through a second hydrocyclone;
   l. returning solids from the underflow side of said second hydrocyclone to said cuttings being removed on said second inclined conveyor;
   m. removing overflow hot rinse water from said second hydrocyclone into a settling tank for flotation separation of hydrocarbon from said hot rinse liquid;
   n. passing said treated rinse water through said condensing unit as a heat exchange agent therefor, to provide cooling for the condensation and to heat the rinse water, and thereafter reintroducing said heated rinse water into said second tank to assist further in removing oil and stripper solution from said cuttings and drilling mud components;
   o. continuously removing portions of said cuttings and drilling mud components, free of oil and stripper solution, from said second tank by elevating them above the surface of said body of hot rinse water on an inclined conveyor;
   screening to separate the said cuttings from said drilling mud components; and
   q. processing said separated drilling mud components for re-use in drilling mud, and returning the cleansed cuttings to the environment.

18. The method defined in claim 17 and further comprising the added step of introducing said cuttings and drilling mud components removed from said second tank into a third tank for rinsing before separation of the said drilling mud components for re-use.

19. The method defined in claim 17 wherein the second portion of hot rinse water from said second hydrocyclone is filtered before being reintroduced into said second tank.

20. The method defined in claim 19 wherein said rinse water is filtered with activated carbon.

21. The method defined in claim 19 wherein said rinse water is filtered with a particulate material having an oleophilic, hydrophobic coating comprising a base layer of a mixture of sulfur, a metallic sulfate, and an alkali metal nitrate, and an outer carbonized layer.

22. The method defined in claim 21 wherein said particulate material is a mineral aggregate selected from the group consisting of vermiculite, perlite, pumicite, sand, gravel and silica.

23. The method defined in claim 21 wherein the metallic sulfate is ferrous sulfate.

24. The method defined in claim 21 wherein the alkali metal nitrate is sodium nitrate.

25. The method defined in claim 21 wherein the outer carbonized layer is burned hydrocarbon oil.

* * * * *

UNITED STATES PATENT AND TRADEMARK OFFICE
CERTIFICATE OF CORRECTION

PATENT NO. : 5,199,997
DATED      : April 6, 1993
INVENTOR(S): Gene B. Stowe

It is certified that error appears in the above-identified patent and that said Letters Patent is hereby corrected as shown below:

In claim 17, column 14, line 38, subsection --p.-- is inserted before "screening".

Signed and Sealed this

Thirtieth Day of November, 1993

BRUCE LEHMAN

Attest:

Attesting Officer

Commissioner of Patents and Trademarks